United States Patent [19]

Chen

[11] Patent Number: 5,162,469
[45] Date of Patent: Nov. 10, 1992

[54] COMPOSITION FOR RIGID GAS PERMEABLE CONTACT LENSES

[75] Inventor: Richard Y. S. Chen, Raleigh, N.C.

[73] Assignee: Optical Research Inc., Raleigh, N.C.

[21] Appl. No.: 740,591

[22] Filed: Aug. 5, 1991

[51] Int. Cl.$^5$ .................... C08F 214/18; G03B 21/46
[52] U.S. Cl. .................... 526/245; 526/279; 523/107; 351/160 R; 351/160 H
[58] Field of Search ............... 526/245, 279; 523/107; 351/160 R, 160 H

[56] References Cited

U.S. PATENT DOCUMENTS

| | | |
|---|---|---|
| 3,282,905 | 11/1966 | Fasick . |
| 3,808,178 | 4/1974 | Gaylord . |
| 3,940,207 | 2/1976 | Barkdoll . |
| 4,120,570 | 10/1978 | Gaylord . |
| 4,130,706 | 12/1978 | Plambeck, Jr. . |
| 4,139,692 | 2/1979 | Tanaka et al. . |
| 4,143,949 | 3/1979 | Chen . |
| 4,388,436 | 6/1983 | Chen . |
| 4,540,761 | 9/1985 | Kawamura et al. ........... 526/245 |
| 4,650,843 | 3/1987 | Yokoyama et al. . |
| 4,661,573 | 4/1987 | Ratkowski et al. . |
| 4,673,621 | 6/1987 | Fujiki et al. ................ 526/245 |
| 4,686,267 | 8/1987 | Ellis et al. . |
| 4,743,106 | 5/1988 | Novicky . |
| 4,771,089 | 9/1988 | Ofstead . |
| 4,812,598 | 3/1989 | Chen . |
| 4,820,747 | 4/1989 | Chen . |
| 4,822,864 | 4/1989 | Chen . |
| 4,829,137 | 5/1989 | Stoyan . |
| 4,900,764 | 2/1990 | Highgate et al. . |

FOREIGN PATENT DOCUMENTS

| | | | |
|---|---|---|---|
| 3609459 | 10/1986 | Fed. Rep. of Germany | 526/245 |
| 45-1271 | 1/1970 | Japan | 526/245 |
| 0163623 | 12/1981 | Japan . | |
| 59-129208 | 7/1984 | Japan | 526/245 |
| 59-203788 | 11/1984 | Japan | 526/245 |
| 61-209286 | 9/1986 | Japan | 526/245 |
| 0825548 | 5/1981 | U.S.S.R. . | |
| 971732 | 10/1964 | United Kingdom | 526/245 |

*Primary Examiner*—Joseph L. Schofer
*Assistant Examiner*—N. Sarofim
*Attorney, Agent, or Firm*—Bell, Seltzer, Park & Gibson

[57] ABSTRACT

A copolymer for making contact lenses comprises, by weight, from about 5 to about 85 percent of a polymerizable fluoromonomer, and from about 5 to about 75 percent of a polymerizable hydrolyzable silicone monomer. A polymerizable hydrophilic monomer can also be included. Additionally, an initiator and a crosslinker are usually preferably employed, but the initiator is not needed when polymerization is aided by radiation from a radioactive source such as cobalt-60.

26 Claims, No Drawings

COMPOSITION FOR RIGID GAS PERMEABLE CONTACT LENSES

BACKGROUND OF THE INVENTION

This invention relates to contact lenses, and in particular to rigid or hard contact lens having an exceptional combination of oxygen permeability, strength, and resistance to protein and mucus deposits.

There is a great need for a contact lens that has high oxygen permeability, wettability and resistance to protein and mucus deposits. These properties all contribute to an extension of the time during which a contact lens can be continuously worn by a wearer. High oxygen permeability is needed because the pupil of the eye has no blood circulation and extracts the oxygen needed by its cells directly from the atmosphere. Wettability is essential for wearer comfort. Resistance to protein and mucus deposits from fluids that bathe the outer surface of the eye is essential since without this property the deposits will irritate the cornea and in some severe cases the deposits will scratch the cornea surface. Also as a result of the deposits, both visual acuity and the oxygen permeability of the lens can suffer.

Many types of contact lens compositions have been proposed. There are two general categories of contact lenses—rigid and hydrogel. For example, U.S. Pat. Nos. 3,808,178 and 4,120,570 to Gaylord; 4,139,692 to Tanaka et al; 4,686,276 to Ellis et al; 4,743,106 to Novicky et al and to Chen 4,812,598 propose the use of various copolymer compositions including silicon in contact lenses. U.S. Pat. No. 4,130,706 to Plambeck, Jr. proposes a methacrylate-type fluoropolymer ("FMA") for making contact lenses. While the lenses are described as hydrophilic and oxygen permeable, it is believed that they are not wettable enough to be truly comfortable to persons wearing the lenses and are not sufficiently permeable to oxygen to be worn safely and continuously for extended periods. U.S. Pat. No. 3,940,207 to Barkdoll proposes contact lenses constructed of fluorine-containing polymers that are soft and have a low refractive index. It is believed that these contact lenses are not sufficiently oxygen permeable to be worn safely for extended periods.

It would be highly desirable to provide a copolymer which can be used to form a rigid contact lens having the combination of oxygen permeability, wettability and resistance to protein and mucus deposits and having the ability to correct for astigmatism.

SUMMARY OF THE INVENTION

The present invention relates to a copolymer for making rigid contact lenses. The copolymer comprises, by weight, about 5 percent to about 85 percent of a polymerizable fluoromonomer and about 5 percent to about 75 percent of a polymerizable hydrophobic hydrolyzable silicone monomer. The copolymer can include up to about 30 percent by weight of a polymerizable hydrophilic monomer. Optionally, an initiator and a crosslinker are employed under circumstances disclosed below.

DETAILED DESCRIPTION OF THE PREFERRED EMBODIMENTS

The present invention utilizes in various combinations as described below a polymerizable fluoromonomer, a polymerizable hydrophobic hydrolyzable silicone monomer, a polymerizable hydrophilic monomer, an initiator, and a crosslinker.

The polymerizable fluoromonomer useful herein can vary. The weight of the fluoromonomer can be from about 5 to about 85 percent, preferably from about 10 to about 40 percent, and most preferably from about 20 to about 30 percent of the weight of the copolymer.

An exemplary fluoromonomer is one based on a fluoroacrylate composition which includes the following fluorine-containing monomer:

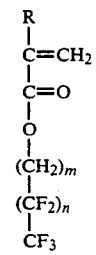

where R is H or $CH_3$, m is an integer from 0 to 9, and n is an integer from 0 to 4. A similar monomer is disclosed in U.S. Pat. No. 4,130,706 to Plambeck, Jr., the disclosure of which is incorporated herein by reference.

Another exemplary fluoromonomer can be a fluoracrylate

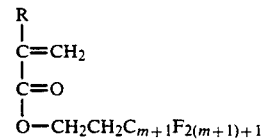

where R and m are defined as above. A similar monomer is disclosed in U.S. Pat. No. 3,282,905 to Fosick, et al, the disclosure of which is incorporated herein by reference.

A particularly preferred composition is 2,2,2-trifluoroethyl methacrylate ("FMA").

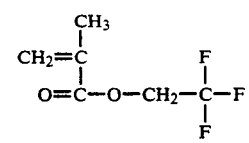

Alternatively, styryl fluoromonomers can be employed. The general formula of these monomers is

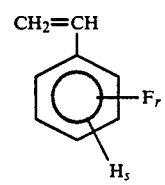

where $r+s=5$ and r is an integer from 1 to 5 and s is an integer from 0 to 5. A particularly preferred styryl fluoromonomer is pentafluorostyrene.

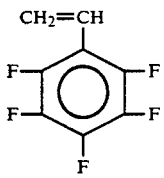

Alternatively, vinyl fluoromonomers can be used. They have the general formula

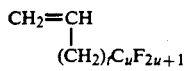

where t is an integer from 1 to 4 and u is an integer from 1 to 9. A particularly preferred vinyl fluoromonomer is 3,3,3-trifluorovinylpropane

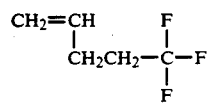

Other examples of vinyl fluoromoners are p-vinyl benzyl trifluoroacetate and p-vinyl benzyl hexafluoroisopropyl ether.

Alternatively, pentafluorocyclohexyl acrylates can be used having the general formula

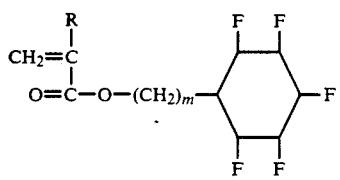

where R is H or $CH_3$ and m is 0 to 9. A particularly preferred pentafluorocyclohexyl acrylate is where R is $CH_3$ and m is 0, i.e., pentafluorocyclohexyl methacrylate.

The polymerizable hydrophobic hydrolyzable silicone monomer useful herein can vary. The weight of the silicone monomer can be from about 5 to about 85 percent by weight, preferably from about 30 to about 60 percent by weight, and most preferably about 50 percent by weight of the copolymer.

The hydrolyzable silicone monomers include silicone monomers which react with water to form two or more new compounds. For example, an exemplary specific hydrolyzable silicone monomer is

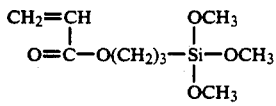

which is hydrolyzes to

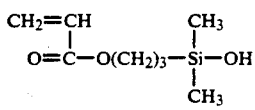

or

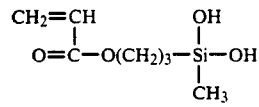

or

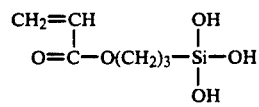

In general, the hydrolyzable silicone monomer has the general formula

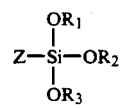

where $R_1$, $R_2$ and $R_3$ are $H_2$ and/or alkyl groups having from 1 to 9 carbons and Z is an alkyl group, an aryl group or an alkylaryl group having from 1 to 9 carbons. For example, styrylmethyltrimethoxysilane ("S1588")

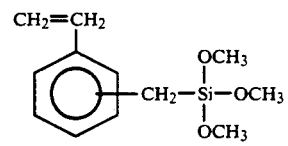

can be used.

Alternatively hydrolyzable silicon monomers can have an epoxy structure and have the general formula a

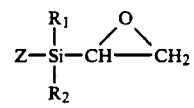

wherein $R_{1, 2}$ and Z are defined as before.

For example,

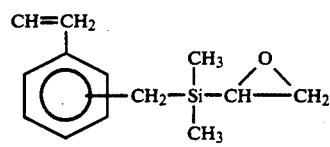

styrylmethylglycioxydimethylsilane, can be used.

Additionally, the hydrophobic hydrolyzable silicone monomer can be blended or copolymerized with a non-hydrolyzable monomer such as a non-hydrolyzable silicon monomer to result in a different hydrolyzable silicon monomer. The weight of the non-hydrolyzable silicone monomer can be up to about 85 percent by An exemplary non-hydrolyzable silicone monomer has the formula

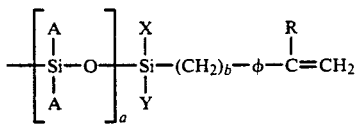

where a is an integer from 1 to 5 and b is an integer from 0 to 6, A is selected from the group consisting of $C_1$-$C_5$ alkyl groups and phenyl groups, R is selected from the group consisting of a methyl group ($CH_3$) and hydrogen, φ is a phenyl group, and X and Y are selected from the group consisting of $C_1$ to $C_5$ alkyl groups, phenyl groups and W groups wherein W is a group of the structure

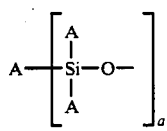

where a and A are as defined previously.

Exemplary non-hydrolyzable silicon-containing monomers are disclosed in U.S. Pat. Nos. 3,808,178 and 4,120,570 to Gaylord, the disclosures of which are incorporated herein by reference.

Alternatively, non-hydrolyzable vinyl silicone monomers can be employed. The general formula can be represented as

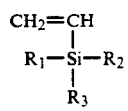

or

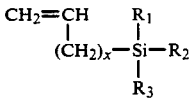

where x is an integer from 1 to 6 and $R_1$, $R_2$ and $R_3$ are selected from the group consisting of $C_1$ to $C_6$ alkyl groups and phenyl groups or a mixture of alkyl and phenyl groups.

Particularly preferred examples of Class (I) are

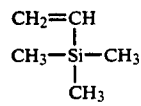

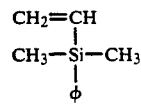

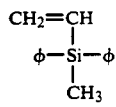

where "φ" represents a phenyl group. Particularly preferred examples of Class (II) of are:

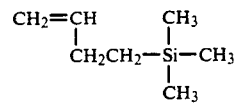

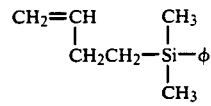

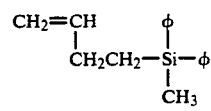

where "φ" represents a phenyl group.

In both classes of non-hydrolyzable vinyl silicone monomers, any methyl group ($CH_3$ group) can be replaced by a benzene ring. Generally, vinyl silicone monomers are less reactive than acrylate silicone monomers. When vinyl silicone monomers are used, cobalt-60 ("Co-60"), radiation may be used as a source of polymerization energy. Co-60 may optionally be used as a source of polymerization energy even when vinyl silicone monomers are not employed.

Additionally, the non-hydrolyzable silicone monomer can be converted to a hydrolyzable silicone monomer by the addition of a non-silicone hydrolyzable compound to the non-hydrolyzable silicone monomer. For example, an epoxy or carboxylic acid, e.g.,

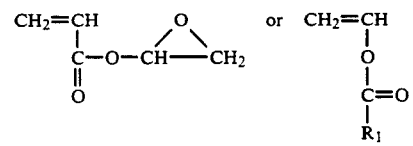

where R1 is as defined above, can be added to or blended with the non-hydrolyzable silicone monomer.

Exemplary non-hydrolyzable silicones include methyldi(trimethylsiloxy)silylpropylglycerol methacrylate, methyldi(trimethylsiloxy)silylpropylglycerolethyl methacrylate, m,p-styrlethyltrimethylsilane, m,p-styrylethyltris(trimethylsiloxy)silane, methylacryloxypropyltris(trimethylsiloxy)silane and 4-(3-trimethylsilylpropyl)benzylstyrene sulfonate.

The hydrophilic polymerizable monomer useful herein can vary. The weight of the hydrophilic polymerizable monomer can be up to about 30 percent, and from about 5 to about 15 percent by weight of the copolymer is preferred. Examples of suitable types of hydrophilic monomers include α-methylene-N-methylpyrrolidone ("α-MMP"), methyl methacrylate ("MMA"), methacrylic acid ("MA"), 2-hydroxyethylmethacrylate ("HEMA"), N-vinyl-2-pyrrolidone, glyceryl methacrylate and N,N dimethylacrylamide ("DMA") and mixtures thereof. A particularly preferred hydrophilic polymerizable monomer is α-MMP.

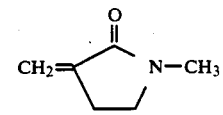

Preferably a crosslinker is used. The crosslinker can constitute, by weight, about 0.0 percent to about 5 percent and more preferably about 0.5 percent to about 2 percent of the weight of the copolymer. The crosslinker is preferably one of a mixture of ethyleneglycoldimethacrylate ("EGDMA"), a fluorine-containing compound, or a silicon-containing compound such as 1,3-bis[(p-acryloxymethyl) phenylethyl]tetramethyldisiloxane or bis(3-methacryloxypropyl)tetramethyldisiloxane.

A quantity of an initiator equal in weight to 0.05 percent to about 2 percent of the weight of the mixture of monomers is preferably added thereto, except when Co-60 is used as a source of polymerization energy. The initiator may be selected from the group consisting essentially of 2,2'-azobis(2,4-dimethylvaleronitrile) ("VAZO 52"), azobisisobutyronitrile ("AIBN"), benzoinmethyl ether ("BME"), di(secbutyl)peroxydicarbonate ("SBC"), and isopropylperoxydicarbonate ("Ipp"). The initiator may also be any of those disclosed in the U.S. Pat. No. 4,120,570, to Gaylord, i.e., acetyl peroxide, lauroyl peroxide, decanoyl peroxide, caprylyl peroxide, benzoyl peroxide, tertiary-butyl peroxypivalate, diisopropyl peroxycarbonate, tertiary-butyl peroctoate, and α,α'-azobisisobutyronitrile.

VAZO 52 or AIBN may be used as an initiator when polymerization is aided by ultraviolet or thermal radiation, BME may be used as the initiator when polymerization is aided by the ultraviolet radiation, and SBC or Ipp may be used as the initiator when polymerization is aided by thermal radiation. Co-60 or another radioactive source may also be used to promote polymerization, particularly when vinyl silicone monomers or other monomers that are not highly reactive are employed. When Co-60 or another radioactive source is not used, polymerization energy is supplied in the form of thermal energy or in the form of ultraviolet radiation, as may be appropriate in view of the initiator employed. When Co-60 radiation is employed, no initiators are needed.

After curing, the resulting polymer is formed into contact lenses by any conventional or otherwise suitable process. The buttons which are the starting material of lenses, have a Shore Hardness (D scale) within the range of 70 to 95. Oxygen permeability in DK units (ml cm/cm$^2$ sec cmHg$\times 10^{-10}$) at 35° C. is with the range of 5° to 120°, light transmission is greater than 95%, and the water content is within the range of about 0.01 to about 2 percent.

The following examples set forth representative formulas for the materials used in making formulas for the materials used in making contact lenses according to the invention:

EXAMPLE 1

The following are mixed at room temperature in a 100 ml beaker:

| Ingredients | Grams |
| --- | --- |
| FMA[1] | 20.0 |
| S1588[2] | 18.0 |
| MDC[3] | 41.7 |
| MA[4] | 16.0 |
| EGDMA[5] (crosslinker) | 4.0 |

-continued

| Ingredients | Grams |
| --- | --- |
| VAZO 52[6] (initiator) | 0.03 |

[1]2,2,2-trifluoroethyl methacrylate available from Aldrich Chemical Co., Milwaukee, WI
[2]styrylmethyltrimethoxysilane available from Huls America, Inc. of Newark, New Jersey
[3]methylacryloxypropyltris(trimethylsiloxy)silane available from Huls America, Inc.
[4]methacrylic acid
[5]ethyleneglycoldimethacrylate available from Rohm Tech, Inc. of Marden, Mass
[6]2,2'-azobis(2,4-dimethylvaleronitrile) available from Polyscience, Inc. of Warrington, PA The initiator is added to the mixture, and the mixture is poured into 10 test tubes and polymerized by application of heat at a temperature of 30° C. for approximately 10 hours. This is accomplished by placing the test tube in a hot water bath at a temperature of 30° C. The polymerized material is a colorless, solid, transparent polymer. The polymer is lathe-cut into buttons of conventional shape and size. The buttons are ground to the shape of contact lenses having respective center thicknesses of 0.1 mm to 0.2mm, and then polished. The lenses are highly transparent (light transmission is greater than 95%) and have uniform optical properties. They have an oxygen permeability of 50 DK units at 35° C. (normal eye temperature), a contact angle of less than 20°, and a refractive index of 1.47. The lens can correct an astigmatism to about 4.0 DO.

The following examples are similar to Example 1 but illustrate variations of the materials and quantities thereof employed and of the method of polymerization.

EXAMPLES 2

| Ingredients | Grams |
| --- | --- |
| FMA | 17.0 |
| T3060[7] | 16.0 |
| MDC | 50.0 |
| MA | 4.05 |
| EGDMA | 0.8 |
| HEMA[8] | 8.0 |
| VAZO 52 | 0.4 |

[7]2-(trimethysiloxy)ethylmethacrylate available from Huls America
[8]hydroxyethylmethacrylate available from Rohm Tech, Inc.

EXAMPLE 3

| Ingredients | Grams |
| --- | --- |
| FMA | 10.0 |
| S1588 | 8.02 |
| MDC | 55.0 |
| MA | 4.5 |
| MMA[9] | 10.0 |
| EGDMA | 0.2 |
| M8550[10] | 12.3 |
| VAZO 52 | 0.3 |

[9]methylmethacrylate available from Aldrich Chemical Company
[10]3-methacycloxypropyltrimethoxysilane available from Huls America, Inc.

EXAMPLE 4

| Ingredients | Grams |
| --- | --- |
| FMA | 10.0 |
| MDC | 55.0 |
| MA | 12.5 |
| MMA | 10.0 |
| EGDMA | 0.2 |
| M8550 | 12.3 |
| VAZO 52 | 0.3 |

EXAMPLE 5

| 2HPMA[11] | 6.9 |
|---|---|
| S1588 | 24.05 |
| MDC | 49.8 |
| MA | 13.4 |
| MMA | 3.15 |
| EGDMA | 0.7 |

[11]2-hydroxylpropylmethacrylate available from Monomer-Polymer and Dajac Laboratories, Inc. of Trevose, Pennsylvania.

Thus there is provided in accordance with the invention a novel and high-effective contact lens that has an exceptional combination of oxygen permeability, wettability of resistance to protein and mucus deposits that has the ability to correct astigmatism. A novel material for manufacturing the lens is also provided, and it is noted that the material may be used for other medical articles needing the combination of oxygen permeability, wettability and resistance to protein and mucus deposits. Many modifications of the preferred embodiments of the invention disclosed above will readily occur to those skilled in the art upon consideration of this disclosure. For example, initiators other than the ones disclosed may be employed, the contact lens may be tinted or clear, the temperature and times of polymerization may vary, etc. Accordingly, the invention is not limited except by the appended claims.

That which is claimed is:

1. A copolymer useful for making rigid contact lenses, said copolymer comprising:
   (a) from about 5 to about 85 percent of a polymerizable fluoromonomer and
   (b) from about 5 to about 75 percent of a polymerizable hydrophobic hydrolyzable silicone monomer.

2. A copolymer according to claim 1 including up to about 30 percent by weight of a polymerizable hydrophilic monomer.

3. A copolymer according to claim 2 wherein said hydrophilic monomer is selected from the group consisting of o-methylene-N-methylpyrrolidone, methacrylic acid, 2-hydroxyethylmethacrylate, N-vinyl-2-pyrrolidone, glycerylmethacrylate and N,N dimethylacrylamide and mixtures thereof.

4. A copolymer according to claim 1 wherein said hydrophobic hydrolyzable silicone monomer includes up to about 85 percent of a non-hydrolyzable silicone monomer.

5. A copolymer according to claim 1 including about 0.01 percent to about 5 percent by weight of an initiator.

6. A copolymer according to claim 1 including from about 0.01 percent to about 2 percent of a crosslinker.

7. A copolymer according to claim 1 wherein the weight of said fluoromonomer is from about 10 percent to about 40 percent of said copolymer.

8. A copolymer according to claim 1 wherein the weight of said fluoromonomer is from about 20 percent to about 30 percent of the weight of said copolymer.

9. A copolymer according to claim 1 wherein the weight of said silicone monomer is from about 30 percent to about 60 percent of the weight of said copolymer.

10. A copolymer according to claim 1 wherein said fluoromonomer is a fluoroacrylate.

11. A copolymer according to claim 10 wherein said fluoroacrylate is 2,2,2-trifluoroethyl methacrylate.

12. A copolymer according to claim 1 wherein said fluoromonomer is a styryl fluoromonomer.

13. A copolymer according to claim 12 wherein said styryl fluoromonomer is pentafluorostyrene.

14. A copolymer according to claim 1 wherein said fluoromonomer is a vinyl fluoromonomer.

15. A copolymer according to claim 14 wherein said vinyl fluoromonomer is selected from the group of 3,3,3-trifluorovinylpropane, p-vinyl benzyltrifluoroacetate and p-vinyl benzyl hexafluoroisopropyl ether.

16. A copolymer according to claim 1 wherein said fluoromonomer is a pentafluorocyclohexyl acrylate.

17. A copolymer according to claim 1 wherein said fluoromonomer is pentafluorocyclohexylmethacrylate.

18. A copolymer according to claim 4 wherein said non-hydrolyzable silicone monomer is

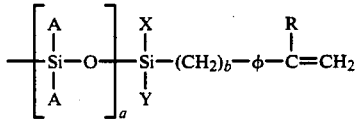

where a is an integer from 1 to 5 and b is an integer from 0 to 6, A is selected from the group consisting of $C_1$–$C_5$ alkyl groups and phenyl groups, R is selected from the group consisting of a methyl group and hydrogen, X and Y are selected from the group ($CH_3$) and hydrogen, X and Y are selected from the group consisting of $C_1$ to $C_5$ alkyl groups, phenyl groups and Z groups wherein Z is a group of the structure

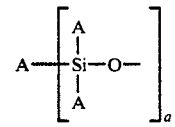

where a and A are as defined previously, and $\phi$ is a phenyl group.

19. A copolymer according to claim 4 wherein said non-hydrolyzable silicone monomer is selected from the group consisting of methyldi(trimethylsiloxy)silylpropylglycerol methacrylate, methyldi(trimethylsiloxy)silylpropylglycerolethyl methacrylate, m,p-styrylethyltrimethylsilane, m,p-styrylethyltris(trimethylsiloxy)silane, methylacryloxypropyltris(trimethylsiloxy)silane and 4-(3-trimethylsilylpropyl)benzylstyrene sulfonate.

20. A copolymer according to claim 4 wherein said non-hydrolyzable silicone monomer is a vinyl silicone monomer.

21. A copolymer according to claim 5 wherein said initiator is selected from the group consisting of 2,2'-azobis(2,4-dimethylvaleronitrile), azobisisobutyronitrile, benzoinmethyl ether, di(secbutyl)peroxydicarbonate, and isopropyl peroxydicarbonate.

22. A copolymer according to claim 6 further comprising, by weight, 0.2 percent to 2 percent of a crosslinker selected from the group consisting of ethylene glycoldimethacrylate, a silicon-containing crosslinker, a fluorine-containing crosslinker, and mixtures thereof.

23. A copolymer according to claim 6 further comprising 0.01 percent to 5 percent of a crosslinker comprising ethyleneglycoldimethacrylate.

24. A copolymer according to claim 6 further comprising 0.01 percent to 5 percent of a crosslinker comprising 1,3-bis[(p-acryloxymethyl) phenylethyl]tetramethyldisiloxane.

25. A copolymer according to claim 6 further comprising 0.01 percent to 5 percent of a crosslinker comprising bis(3-methacryloxypropyl) tetramethyldisiloxane.

26. A contact lens made from the copolymer of claim 1.

* * * * *

UNITED STATES PATENT AND TRADEMARK OFFICE
CERTIFICATE OF CORRECTION

PATENT NO. : 5,162,469

DATED : November 10, 1992

INVENTOR(S) : Richard S. Chen

It is certified that error appears in the above-identified patent and that said Letters Patent is hereby corrected as shown below:

Column 3, line 15, "$(CH_2)_r C_u F_{2u+1}$", should be $(CH_2)_t C_u F_{2u+1}$.

Column 4, line 40, "a" after formula should be deleted.

Column 4, line 48, "$R_{1,2}$" should be -- $R_1, R_2$ --.

Column 6, line 40, "R1" should be -- $R_1$ --.

Column 7, line 2, "0.0" should be -- 0.01 --.

Column 7, line 48, "with" should be -- within the range of 5 to 50. Contact angle is within --.

Colunm 7, line 54, "formulas for the materials used in making" should be deleted.

Column 9, line 64, "fluoroacrylate" should be --fluoroacyrylate --.

UNITED STATES PATENT AND TRADEMARK OFFICE
CERTIFICATE OF CORRECTION

PATENT NO. : 5,162,469

DATED : November 10, 1992

INVENTOR(S) : Richard S. Chen

It is certified that error appears in the above-identified patent and that said Letters Patent is hereby corrected as shown below:

Column 10, line 22, after the word "group", insert --$(CH_3)$--.

Column 10, line 23, after the word "group", delete the words --CCH3) and hydrogen X and Y are selected from the group--.

Signed and Sealed this

Nineteenth Day of October, 1993

Attest:

BRUCE LEHMAN

*Attesting Officer*    *Commissioner of Patents and Trademarks*